US012731026B2

(12) United States Patent
Fang et al.

(10) Patent No.: US 12,731,026 B2
(45) Date of Patent: Sep. 8, 2026

(54) METHOD AND SYSTEM FOR PROGRAM SAMPLING USING NEURAL NETWORK

(71) Applicant: Alibaba (China) Co., Ltd., Hangzhou (CN)

(72) Inventors: Yuanwei Fang, Sunnyvale, CA (US); Jian Chen, Sunnyvale, CA (US); Yen-Kuang Chen, Palo Alto, CA (US); Yuan Xie, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 809 days.

(21) Appl. No.: 17/976,193

(22) Filed: Oct. 28, 2022

(65) Prior Publication Data

US 2023/0394300 A1 Dec. 7, 2023

Related U.S. Application Data

(60) Provisional application No. 63/349,578, filed on Jun. 6, 2022.

(51) Int. Cl.
*G06N 3/08* (2023.01)
*G06F 8/41* (2018.01)

(52) U.S. Cl.
CPC ................ *G06N 3/08* (2013.01); *G06F 8/41* (2013.01)

(58) Field of Classification Search
CPC .......... G06N 3/08; G06N 3/044; G06N 3/045; G06F 8/41; G06F 8/433; G06F 8/44
See application file for complete search history.

(56) References Cited

U.S. PATENT DOCUMENTS 7,813,822 B1 10/2010 Hoffberg
9,720,403 B2 8/2017 Power et al.
9,734,169 B2 8/2017 Redlich et al.
(Continued)

OTHER PUBLICATIONS

Wunderlich et al., "SMARTS: Accelerating Microarchitecture Simulation via Rigorous Statistical Sampling", Jun. 2003, Proceedings of the 30th Annual International Symposium on Computer Architecture (ISCA'03), 12 pages (Year: 2003).*
(Continued)

*Primary Examiner* — Jennifer N Welch
*Assistant Examiner* — Vijay M Balakrishnan
(74) *Attorney, Agent, or Firm* — Sheppard Mullin Richter & Hampton LLP

(57) ABSTRACT

This application describes methods, systems, and apparatus, for neural network-based program sampling (NPS). An example device may obtain an assembly code of a program and an execution trace of the program, and divide the assembly code into a plurality of execution intervals. The device may construct a plurality of code graphs respectively corresponding to the plurality of execution intervals, and for each of the plurality of code graphs: generate a plurality of graph snapshots based on the code graph and the execution trace of the program; embed, by using a Graph Neural Network, the plurality of graph snapshots into a plurality of vectors; and aggregate the plurality of vectors into an execution embedding. The device may cluster the plurality of execution embeddings into a plurality of clusters and select representative execution intervals of the program based on the plurality of clusters for execution.

20 Claims, 12 Drawing Sheets

(56) References Cited

U.S. PATENT DOCUMENTS

| | | | | |
|---|---|---|---|---|
| 9,934,364 | B1 | 4/2018 | Kumar et al. | |
| 10,606,949 | B2 | 3/2020 | Zhu et al. | |
| 11,108,809 | B2 | 8/2021 | Johns et al. | |
| 11,348,110 | B2 | 5/2022 | Adjaoute | |
| 11,393,250 | B2 | 7/2022 | Mishra et al. | |
| 11,409,587 | B2 | 8/2022 | Bridges et al. | |
| 11,429,934 | B2 | 8/2022 | Demick et al. | |
| 2009/0210447 | A1 | 8/2009 | Moshe | |
| 2015/0363294 | A1 | 12/2015 | Carback, III et al. | |
| 2016/0379309 | A1 | 12/2016 | Shikhare | |
| 2017/0212829 | A1 | 7/2017 | Bales et al. | |
| 2018/0247195 | A1 | 8/2018 | Kumar et al. | |
| 2018/0373986 | A1 | 12/2018 | Rainwater | |
| 2019/0265955 | A1 | 8/2019 | Wolf | |
| 2019/0378616 | A1 | 12/2019 | Abrami et al. | |
| 2020/0326934 | A1* | 10/2020 | Tepper | G06N 3/044 |
| 2021/0142233 | A1 | 5/2021 | Masood et al. | |
| 2021/0186329 | A1 | 6/2021 | Tran | |

OTHER PUBLICATIONS

Hamerly et al., "SimPoint 3.0: Faster and More Flexible Program Phase Analysis", Sep. 2005, Journal of Instruction-Level Parallelism, vol. 7, 28 pages (Year: 2005).*

Xu et al., "A Brief Survey of Program Slicing", Mar. 2005, ACM SIGSOFt Software Engineering Notes, vol. 30 No. 2, 36 pages (Year: 2005).*

Lu et al., "Program Classification Using Gated Graph Attention Neural Network for Online Programming Services", Mar. 9, 2019, arXiv:1903.03804v1, 12 pages (Year: 2019).*

Draelos, "Multi-label vs. Multi-class Classification: Sigmoid vs Softmax", May 26, 2019, https://glassboxmedicine.com/2019/05/26/classification-sigmoid-vs-softmax/, 11 pages (Year: 2019).*

Velickovic et al., "Neural Execution of Graph Algorithms", Jan. 15, 2020, arXiv: 1910. 10593v2, 14 pages (Year: 2020).*

Guo et al., "GRAPHSPY: Fused Program Semantic-Level Embedding via Graph Neural Networks for Dead Store Detection", Nov. 18, 2020, arXiv:2011.09501v1, 9 pages (Year: 2020).*

Flolid et al., "SimTrace: Capturing Over Time Program Phase Behavior", Aug. 2020, 2020 IEEE International Symposium on Performance Analysis of Systems and Software (ISPASS), 3 pages (Year: 2020).*

Farina, "A Crash Course in Assembly Language—The Basics of x86 Assembly for Reverse Engineering", Mar. 26, 2021, https://medium.com/reverse-engineering-for-dummies/a-crash-course-in-assembly-language-695b07995b4d, 12 pages (Year: 2021).*

"Apache kafka," https://kafka.apache.org/, retrieved on Nov. 4, 2022.

SPEC CPU® 2006, Standard Performance Evaluation Corporation, https://www.spec.org/cpu2006/, retrieved on Nov. 4, 2022.

"Synopsys DSO.ai," Synopsys, https://www.synopsys.com/implementation-and-signoff/ml-ai-design/dso-ai.html, retrieved on Nov. 4, 2022.

"Valgrind User Manual," Valgrind™ Developers, https://valgrind.org/docs/manual/bbv-manual.html, retrieved on Nov. 4, 2022.

Akram et al., "Validation of the gem5 Simulator for x86 Architectures," 2019 IEEE/ACM Performance Modeling, Benchmarking and Simulation of High Performance Computer Systems (PMBS), Nov. 2019.

Allamanis et al., "Learning to Represent Programs with Graphs," ICLR 2018, May 4, 2018.

Alon et al., "code2vec: Learning Distributed Representations of Code," Oct. 30, 2018.

Ando, "SWQUE: A Mode Switching Issue Queue with Priority-Correcting Circular Queue," Oct. 2019.

Awad et al., "STM: Cloning the spatial and temporal memory access behavior," 2014 IEEE 20th International Symposium on High Performance Computer Architecture (HPCA), Feb. 2014.

Badr et al., "Mocktails: Capturing the memory behaviour of proprietary mobile architectures," 2020 ACM/IEEE 47th Annual International Symposium on Computer Architecture (ISCA), 2020, downloaded on Jul. 28, 2020.

Bai et al., "Boom-explorer: Risc-v boom microarchitecture design space exploration framework," 2021 IEEE/ACM International Conference On Computer Aided Design (ICCAD), Nov. 2021.

Bera et al., "Dspatch: Dual spatial pattern prefetcher," Proceedings of the 52nd Annual IEEE/ACM International Symposium on Microarchitecture, Oct. 2019.

Bieber et al., "Learning to execute programs with instruction pointer attention graph neural networks," 34th Conference on Neural Information Processing Systems (NeurIPS 2020), Oct. 23, 2020.

Binkert et al., "The gem5 simulator," ACM SIGARCH Computer Architecture News, vol. 39, No. 2, May 2011.

Chen et al., "DWT: Decoupled Workload Tracing for Data Centers," 2020 IEEE International Symposium on High Performance Computer Architecture (HPCA), Feb. 2020.

Choi et al., "Encoding musical style with transformer autoencoders," International Conference on Machine Learning. PMLR, Jun. 30, 2020.

Dai et al., "Transformer-xl: Attentive language models beyond a fixed-length context," Proceedings of the 57th Annual Meeting of the Association for Computational Linguistics, Jun. 2019.

Dinella et al., "Hoppity: Learning graph transformations to detect and fix bugs in programs," ICLR 2020, Sep. 2019.

Haj-Ali et al., "Neurovectorizer: End-to-end vectorization with deep reinforcement learning," Proceedings of the 18th ACM/IEEE International Symposium on Code Generation and Optimization, Jan. 2020.

Hamerly et al., "Using machine learning to guide architecture simulation," Journal of Machine Learning Research 7, Feb. 2006.

Hamilton et al., "Inductive representation learning on large graphs," 31st Conference on Neural Information Processing Systems (NIPS 2017), Sep. 10, 2018.

Hashemi et al., "Filtered runahead execution with a runahead buffer," Proceedings of the 48th International Symposium on Microarchitecture, Dec. 2015.

Hashemi et al., "Learning memory access patterns," International Conference on Machine Learning, Mar. 2018.

Jain et al., "Back to the future: Leveraging belady's algorithm for improved cache replacement," 2016 ACM/IEEE 43rd Annual International Symposium on Computer Architecture (ISCA), IEEE, Jun. 2016.

Kipf et al., "Semi-supervised classification with graph convolutional networks," International Conference on Learning Representations (ICLR), Feb. 2017.

Li et al., "Gated graph sequence neural networks," International Conference on Learning Representations (ICLR'16), Sep. 22, 2017.

Lin et al., "A Deep Reinforcement Learning Framework for Architectural Exploration: A Routerless NoC Case Study," 2020 IEEE International Symposium on High Performance Computer Architecture (HPCA), IEEE, Feb. 2020.

Luk et al., "Pin: Building Customized Program Analysis Tools with Dynamic Instrumentation," Acm sigplan notices, vol. 40, No. 6, Jun. 2005.

Zangeneh et al., "BranchNet: Using Offline Deep Learning To Predict Hard-To-Predict Branches," Aug. 2019.

Mirhoseini et al., "A graph placement methodology for fast chip design," Nature, vol. 594, No. 7862, Jun. 9, 2021.

Panda et al., "Proxy benchmarks for emerging big-data workloads," 2017 26th International Conference on Parallel Architectures and Compilation Techniques (PACT), IEEE, Apr. 2017.

Patil et al., "ELFies: executable region checkpoints for performance analysis and simulation," 2021 IEEE/ACM International Symposium on Code Generation and Optimization (CGO), IEEE, 2021, downloaded on May 23, 2021.

Patil et al., "Pinplay: a framework for deterministic replay and reproducible analysis of parallel programs," Proceedings of the 8th annual IEEE/ACM international symposium on Code generation and optimization, Apr. 2010.

Perelman et al., "Using simpoint for accurate and efficient simulation," SIGMETRICS'03, Jun. 2003.

Renda et al., "DiffTune: Optimizing CPU Simulator Parameters with Learned Differentiable Surrogates," Dec. 5, 2020.

(56) References Cited

OTHER PUBLICATIONS

Shi et al., "A hierarchical neural model of data prefetching," Proceedings of the 26th ACM International Conference on Architectural Support for Programming Languages and Operating Systems, Apr. 2021.
Shi et al., "Learning Execution through Neural Code Fusion," ICLR 2020, Mar. 11, 2020.
Trask et al., "Neural Arithmetic Logic Units," Aug. 1, 2018.
Veličković et al., "Graph Attention Networks," Feb. 2018.
Wei et al., "LambdaNet: Probabilistic Type Inference using Graph Neural Networks," Apr. 2020.
Ying et al., "Hierarchical Graph Representation Learning with Differentiable Pooling," Feb. 2019.
Zhang et al., "An End-to-End Deep Learning Architecture for Graph Classification," Apr. 2018.
Zhou et al., "GDP: Generalized Device Placement for Dataflow Graphs," Sep. 28, 2019.
First Office Action for Chinese Application No. 202310413817.0 mailed on Jul. 28, 2026.
Hamerly et al., "SimPoint 3.0: Faster and More Flexible Program Analysis", Dec. 31, 2005.

* cited by examiner

Code example for predicting memory address accesses

Figure 4B:
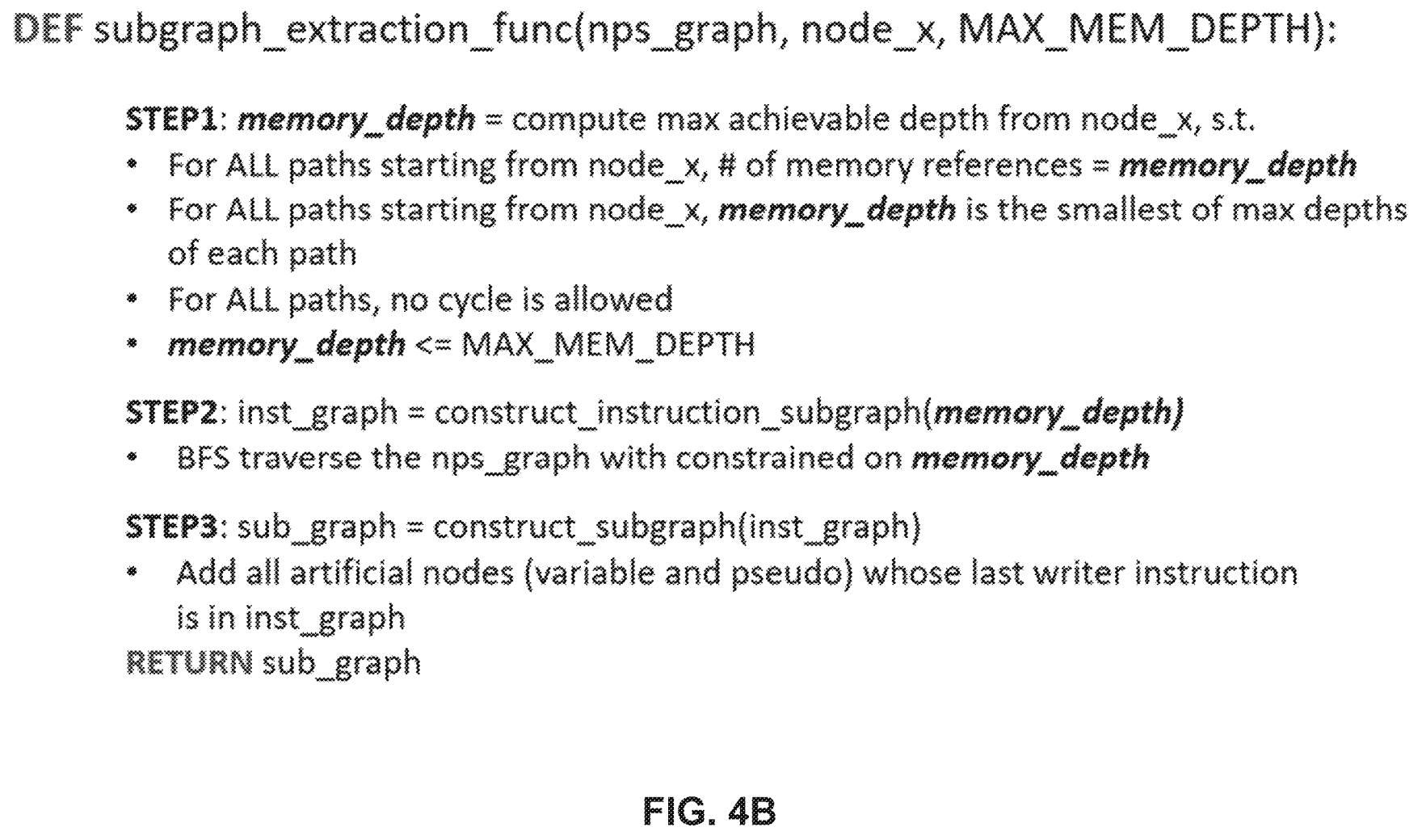

DEF subgraph_extraction_func(nps_graph, node_x, MAX_MEM_DEPTH):

STEP1: *memory_depth* = compute max achievable depth from node_x, s.t.

- For ALL paths starting from node_x, # of memory references = *memory_depth*
- For ALL paths starting from node_x, *memory_depth* is the smallest of max depths of each path
- For ALL paths, no cycle is allowed
- *memory_depth* <= MAX_MEM_DEPTH

STEP2: inst_graph = construct_instruction_subgraph(*memory_depth)*

- BFS traverse the nps_graph with constrained on *memory_depth*

STEP3: sub_graph = construct_subgraph(inst_graph)

- Add all artificial nodes (variable and pseudo) whose last writer instruction is in inst_graph RETURN sub_graph

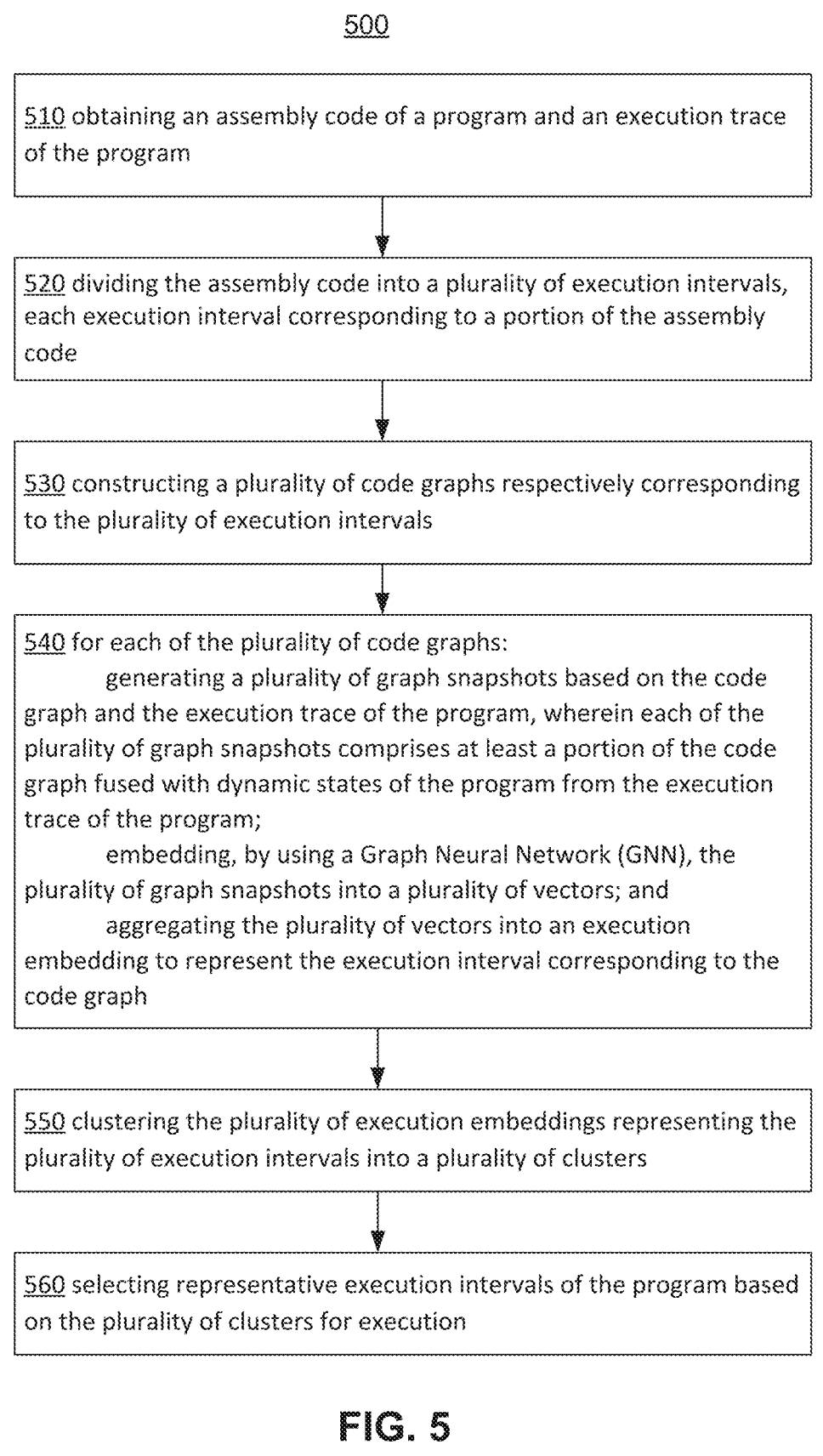

510 obtaining an assembly code of a program and an execution trace of the program 520 dividing the assembly code into a plurality of execution intervals, each execution interval corresponding to a portion of the assembly code 530 constructing a plurality of code graphs respectively corresponding to the plurality of execution intervals 540 for each of the plurality of code graphs:

generating a plurality of graph snapshots based on the code graph and the execution trace of the program, wherein each of the plurality of graph snapshots comprises at least a portion of the code graph fused with dynamic states of the program from the execution trace of the program;

embedding, by using a Graph Neural Network (GNN), the plurality of graph snapshots into a plurality of vectors; and aggregating the plurality of vectors into an execution embedding to represent the execution interval corresponding to the code graph 550 clustering the plurality of execution embeddings representing the plurality of execution intervals into a plurality of clusters 560 selecting representative execution intervals of the program based on the plurality of clusters for execution

FIG. 5

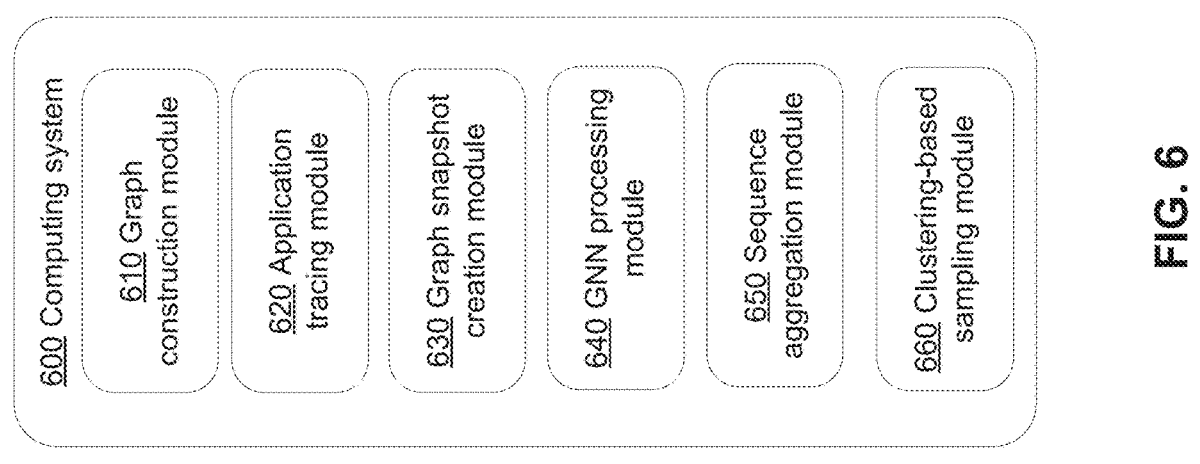

600 Computing system

610 Graph construction module

620 Application tracing module

630 Graph snapshot creation module

640 GNN processing module

650 Sequence aggregation module

660 Clustering-based sampling module

FIG. 6

METHOD AND SYSTEM FOR PROGRAM SAMPLING USING NEURAL NETWORK

CROSS REFERENCE TO RELATED APPLICATIONS

This application claims the benefit of U.S. Provisional Patent Application No. 63/349,578, filed Jun. 6, 2022. The entire contents of the above-identified application are incorporated herein by reference.

TECHNICAL FIELD

The disclosure relates generally to program sampling. More specifically, this disclosure is related to a method and system for program sampling using neural networks (NPS).

BACKGROUND

The revolution of modern computing has been largely enabled by remarkable advances in computer systems and hardware. With the slowing of Moore's Law and Dennard scaling, the world is moving toward specialized hardware to meet the exponentially growing demand for computing. However, today's chips may take a great amount of time to design and perform qualification testing (e.g., functionality testing, performance testing). One of the hardware developers' pain points is the expensive cost of qualifying a new hardware design. For example, various performance benchmark programs may need to run to measure the performance of newly designed hardware. These benchmark programs are usually run on a simulator that simulates the newly designed hardware to measure various performance metrics. Since simulators are expensive and much slower (e.g., thousands of times slower) than actual hardware, running performance benchmark programs on a simulator may take a long time. This gives rise to program sampling, which divides the program execution into intervals, and samples representative sections of benchmark programs within the intervals. These sampled program sections will be executed on simulators to avoid running entire performance benchmark programs. This disclosure describes a novel system and method for accurate program sampling using neural networks.

SUMMARY

Various embodiments of the present specification may include systems, methods, and non-transitory computer-readable media for a neural-network-based program sampling (NPS).

In some aspects, the techniques described herein relate to a computer-implemented method for program sampling. The method may include obtaining an assembly code of a program and an execution trace of the program, and dividing the assembly code into a plurality of execution intervals, where each execution interval corresponding to a portion of the assembly code. The method may further include constructing a plurality of code graphs respectively corresponding to the plurality of execution intervals. For each of the plurality of code graphs, a plurality of graph snapshots may be generated based on the code graph and the execution trace of the program, where each of the plurality of graph snapshots includes at least a portion of the code graph fused with dynamic states of the program from the execution trace of the program. The method may further include embedding, by using a Graph Neural Network (GNN), the plurality of graph snapshots into a plurality of vectors; and aggregating the plurality of vectors into an execution embedding to represent the execution interval corresponding to the code graph; clustering the plurality of execution embeddings representing the plurality of execution intervals into a plurality of clusters; and selecting representative execution intervals of the program based on the plurality of clusters for execution.

In some aspects, the obtaining the assembly code of the program includes: compiling the program written in a high-level programming language into the assembly code of the program.

In some aspects, the constructing the plurality of code graphs respectively corresponding to the plurality of execution intervals includes, for each of the plurality of execution interval: identifying instructions and variables in assembly code in the execution interval; constructing a backbone of a code graph by: creating instruction nodes and variable nodes based on the instructions and variables; connecting the instruction nodes and the variable nodes to represent a control flow and a data flow of the assembly code; adding function nodes to the backbone of the code graph to represent functions that are implied in the assembly code; and connecting the instruction nodes, variable nodes, and function nodes to form the code graph.

In some aspects, the function nodes correspond to functions including memory referencing functions.

In some aspects, the generating the plurality of graph snapshots based on the code graph and the execution trace of the program includes: for a given graph node in the code graph, determining a memory depth based on a number of memory references visited along all code paths in the code graph that start from the given graph node; performing a breadth-first search in the code graph starting from the given graph node constrained by the memory depth to obtain a subgraph of the code graph; and adding intermediate nodes representing the dynamic states extracted from the execution trace to the subgraph to obtain the graph snapshot.

In some aspects, the GNN is a graph attention network (GAT) including parameters jointly trained with a code path selection module and a memory address prediction module.

In some aspects, the GNN is trained by: feeding a training graph snapshot into the GAT for embedding, wherein the training graph snapshot corresponds a ground truth execution trace; obtaining, from the GAT, embeddings of function nodes in the training graph snapshot, wherein the function nodes correspond to memory reference functions in the training graph snapshot; feeding the embeddings of the function nodes into the code path selection module to predict a code path in the training graph snapshots; obtaining embeddings of memory addresses to be visited along the code path; feeding the embeddings of the memory addresses into the address prediction module to predict next memory addresses to be visited along the code path; obtaining prediction errors by comparing the predicted next memory addresses and the ground truth execution trace; and adjusting parameters of the GAT, the code path selection module, and the memory address prediction module to minimize the prediction errors.

In some aspects, the code path selection module includes an attention layer and a weighted unsort segment sum layer for generating weights for code path candidates, wherein a code path candidate with a highest weight is selected as a predicted code path.

In some aspects, after training, the GAT is deployed for embedding graph snapshots.

In some aspects, clustering the plurality of execution embeddings of the plurality of execution intervals into the plurality of clusters includes: clustering the plurality of execution embeddings using K-means.

In some aspects, the selecting representative execution intervals of the program based on the plurality of clusters includes: from one or more of the plurality of clusters, selecting one execution embedding from each of the plurality of clusters; and selecting, from the program, one or more execution intervals that correspond to the one or more selected execution embeddings as the representative execution intervals.

In some aspects, the method may further include executing the representative execution intervals of the program rather than execution an entirety of the program.

In some aspects, the techniques described herein relate to a system including one or more processors and one or more non-transitory computer-readable memories coupled to the one or more processors, the one or more non-transitory computer-readable memories storing instructions that, when executed by the one or more processors, cause the system to perform operations including: obtaining an assembly code of a program and an execution trace of the program; dividing the assembly code into a plurality of execution intervals, each execution interval corresponding to a portion of the assembly code; constructing a plurality of code graphs respectively corresponding to the plurality of execution intervals; for each of the plurality of code graphs: generating a plurality of graph snapshots based on the code graph and the execution trace of the program, wherein each of the plurality of graph snapshots comprises at least a portion of the code graph fused with dynamic states of the program from the execution trace of the program; embedding, by using a Graph Neural Network (GNN), the plurality of graph snapshots into a plurality of vectors; and aggregating the plurality of vectors into an execution embedding to represent the execution interval corresponding to the code graph; clustering the plurality of execution embeddings representing the plurality of execution intervals into a plurality of clusters; and selecting representative execution intervals of the program based on the plurality of clusters for execution.

In some aspects, the techniques described herein relate to a non-transitory computer-readable storage medium configured with instructions executable by one or more processors to cause the one or more processors to perform operations including: obtaining an assembly code of a program and an execution trace of the program; dividing the assembly code into a plurality of execution intervals, each execution interval corresponding to a portion of the assembly code; constructing a plurality of code graphs respectively corresponding to the plurality of execution intervals; for each of the plurality of code graphs: generating a plurality of graph snapshots based on the code graph and the execution trace of the program, wherein each of the plurality of graph snapshots comprises at least a portion of the code graph fused with dynamic states of the program from the execution trace of the program; embedding, by using a Graph Neural Network (GNN), the plurality of graph snapshots into a plurality of vectors; and aggregating the plurality of vectors into an execution embedding to represent the execution interval corresponding to the code graph; clustering the plurality of execution embeddings representing the plurality of execution intervals into a plurality of clusters; and selecting representative execution intervals of the program based on the plurality of clusters for execution.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, where like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4B illustrates an exemplary method of constructing code graph snapshots for NPS in accordance with some embodiments.

FIG. 5 illustrates an exemplary method of NPS in accordance with some embodiments.

FIG. 6 illustrates a block diagram of a computer system apparatus for NPS in accordance with some embodiments.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Figure 1A:
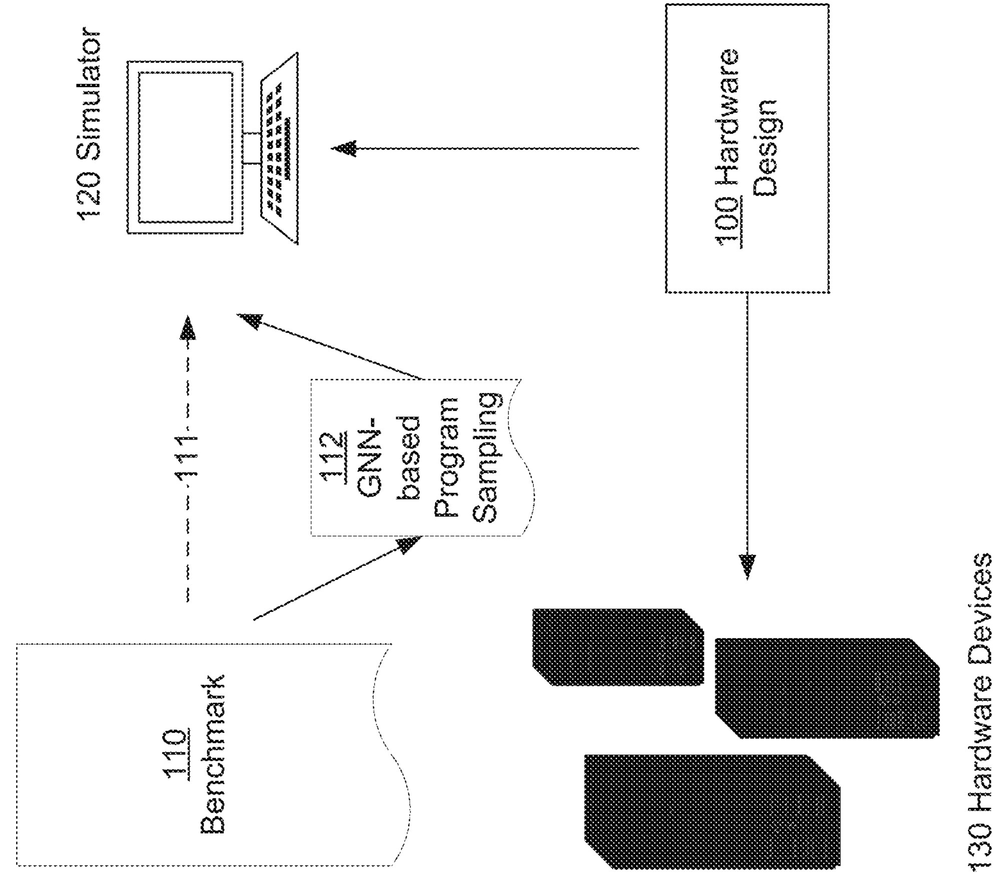
FIG. 1A illustrates exemplary environments in which graph neural network (GNN)-based program sampling (NPS) may be applied in accordance with some embodiments.

FIG. 1A illustrates exemplary environments in which graph neural network (GNN)-based program sampling (NPS) may be applied in accordance with some embodiments. The environment illustrated in FIG. 1A involves running a benchmark program 110 for assessing the performance of a hardware design 100. In today's applications, the benchmark program 110 usually runs on a simulator 120 that simulates the hardware design 100. The simulator 120 may be implemented on an on-premise computer system or a cloud-native hardware development platform (e.g., a cloud electronic design automation (EDA) platform). After the performance assessment is complete, the hardware design 100 may be deployed and implemented using physical hardware devices 130.

In some embodiments, standard benchmark programs such as Standard Performance Evaluation Corporation (SPEC) benchmarks are enormous in size (e.g., billions of instructions) and directly running entire benchmark programs on simulators 120 may be impractical (the dotted line 111 in FIG. 1A). One way to address this issue is to reduce the size of the benchmark programs for running on the simulator 120 by sampling. In practice, the benchmark program 110 may include an exceedingly large number of execution intervals (also called program intervals or code intervals), in which many execution intervals may have similar or even same execution patterns on the hardware design 100. Therefore, accurate sampling of the most representative execution intervals to approximate the entire benchmark program is essential for fast simulations in computer architecture design and development.

In some embodiments, a graph neural network (GNN)-based program sampling (NPS) 112 may be performed on the standard benchmark program 110 to sample the representative sections of the benchmark program 110 to run on the simulator. In order to accurately sampling the representative execution intervals from the benchmark program 110, the NPS 112 may be designed to use a trained GNN to capture data flow, data dependency, control flow, code block topology, and predict next memory address accesses for the execution intervals. Then the NPS 112 embeds all these information for each execution interval as embeddings using low-dimensional vectors. The resultant embeddings are accurate, condensed, and generalized representation of the execution intervals. The execution intervals with similar execution patterns may have similar embeddings. Finally, the NPS 112 clusters the embeddings into groups and selects representative execution interval(s) based on the clustering result (e.g., picking one embedding from each group, and selecting the corresponding execution interval).

In some embodiments, this NPS 112 process may include: obtaining an assembly code of the benchmark program 110 written a high-level language and an execution trace of the benchmark program 110; dividing the assembly code into a plurality of execution intervals, each execution interval corresponding to a portion of the assembly code; constructing a plurality of code graphs respectively corresponding to the plurality of execution intervals; for each of the plurality of code graphs: generating a plurality of graph snapshots based on the code graph and the execution trace of the program, each of the plurality of graph snapshots including at least a portion of the code graph fused with the program's dynamic states from the execution trace of the program; embedding, by using a trained GNN, the plurality of graph snapshots into a plurality of vectors; and aggregating the plurality of vectors into an execution embedding to represent the execution interval corresponding to the code graph; clustering the plurality of execution embeddings representing the plurality of execution intervals into a plurality of clusters; and selecting representative execution intervals of the program based on the plurality of clusters for execution. More details on the NPS 112 process are discussed below.

Figure 1B:
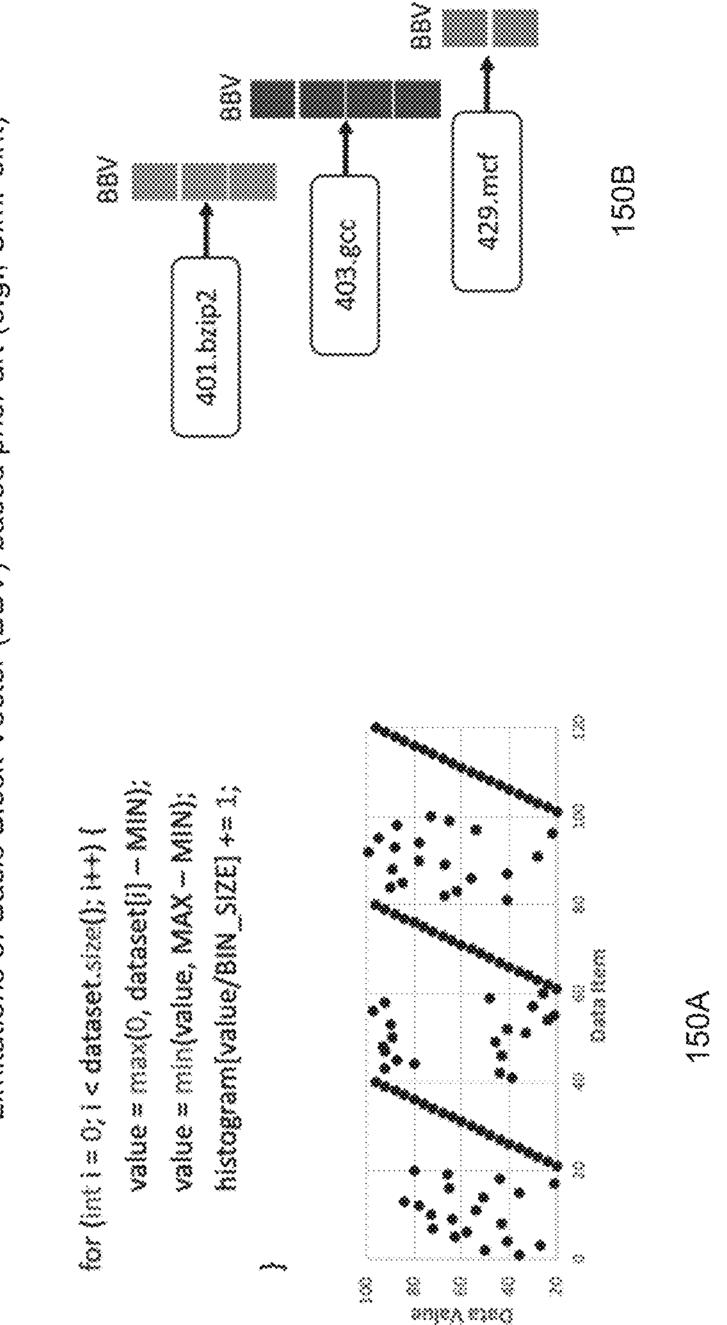
FIG. 1B illustrates the limitations of existing program sampling solutions in accordance with some embodiments.

FIG. 1B illustrates the limitations of existing program sampling solutions in accordance with some embodiments. The state-of-the-art program sampling approach, SimPoint, was developed more than a decade ago, and it relies on Basic Block Vector (BBV) to sample program blocks, where each basic block refers to a piece of assembly code compiled from high-level code (e.g., source code). SimPoint basically samples program blocks based on block visit frequencies, which considers only the control flow information but fails to capture data dependency (e.g., inter- or intra-blocks data dependency) or basic block topology information. As such, SimPoint may be suitable for applications with minimum cross-block dependencies but often fail to generalize across different applications. For instance, SimPoint cannot encode data-dependent memory access information, as illustrated by the examples in FIG. 1B.

The example 150A in FIG. 1B shows a simple histogram code and the corresponding data pattern during execution of the code. The chart in the example 150A demonstrates a repeatable data pattern, i.e., a period of random values followed by a period of sequential values and repeating until the end of the loop. Since SimPoint (or other BBV-based program sampling methods) is blind on the data values within the piece of code (e.g., each line of the code may correspond to a program block), it will fail to tell the obvious execution phases that have significantly different memory behavior (e.g., random vs. stride/sequential). Without this knowledge, SimPoint may randomly pick any phases from the entire execution duration (e.g., picking two phases both corresponding to the random value phases), and thus. fail to accurately sample the most representative execution phases, i.e., the first execution phase with random values and the second execution phase with sequential values, to represent the execution of the code.

The example 150B in FIG. 1B illustrates some other limitations of SimPoint and BBV-based program sampling methods. Because each program is embedded into basic blocks in these approaches, different programs will have different basic blocks. However, the basic blocks' topology information is lost because SimPoint is unaware of block connectivity. In addition, SimPoint cannot capture block-level similarity. For example, if two identical pieces of code stay in different basic blocks (a block in 401.bzip2 is similar to a block in 403.gcc in example 150B), SimPoint assigns them two independent dimensions in two BBVs. Therefore, there is no way to compare basic blocks because the code information within the block is missing. It is difficult to generalize the execution of different programs using basic blocks. Furthermore, SimPoint can't generalize across applications because the block identifier is defined within an application. Thus, we can't compare basic blocks across applications.

Figure 2A:
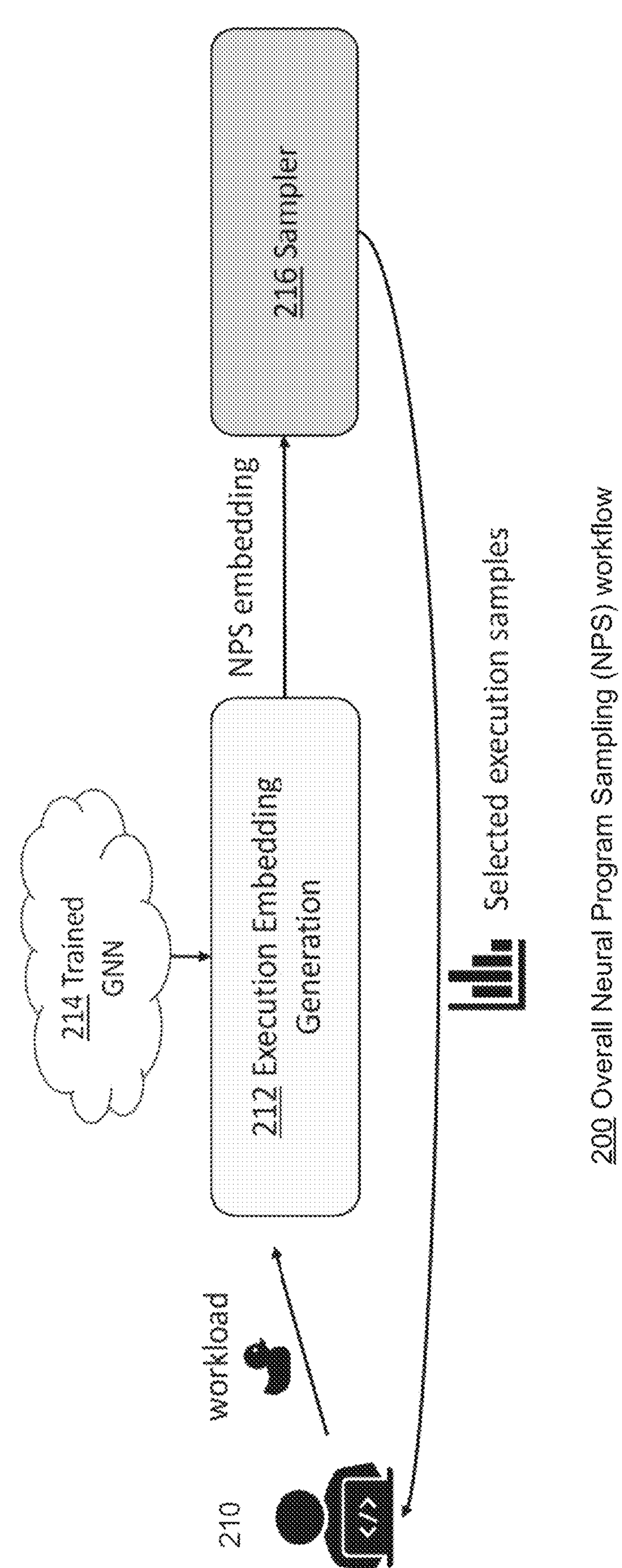
FIG. 2A illustrates an exemplary program sampling using NPS in accordance with some embodiments.

FIG. 2A illustrates an exemplary program sampling using NPS in accordance with some embodiments. The NPS process illustrated in FIG. 2A is to address the above-identified limitations of SimPoint and other BBV-based program sampling methods. The object of the NPS process is to produce high-quality execution embeddings from learned code behavior for program sampling.

Figure 4A:
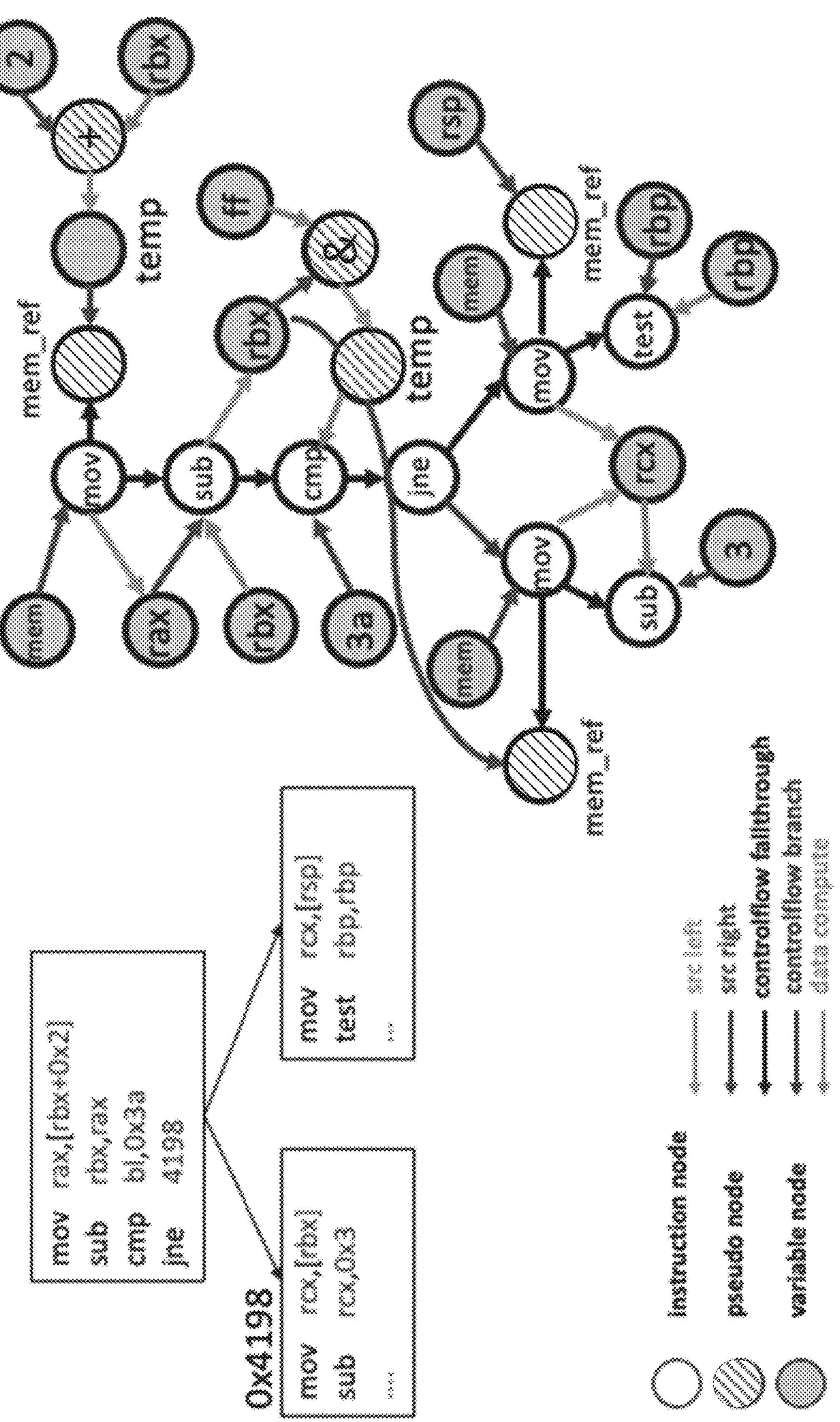
FIG. 4A illustrates an exemplary method of constructing assembly code graph for NPS in accordance with some embodiments.

As shown, an entity 210 (e.g., a programmer or a team) that wants to perform program sampling on a workload (e.g., a benchmark program) may send the workload to an execution embedding generation engine 212 to generate execution embeddings for execution intervals in the workload. The execution embedding generation engine 212 may first construct code graphs for the execution intervals. In some embodiments, the execution intervals may refer to assembly code intervals compiled from the workload (e.g., a program written in a high-level programming language) and thus the code graphs may be referred to as assembly code graphs. The execution intervals may have different lengths. FIG. 4A describes detailed embodiments on constructing assembly code graphs for assembly code intervals in the workload. Since the assembly code graphs are constructed based on the execution intervals, it may include the static information of the assembly code (e.g., control flow) but not dynamic information that are determined during execution time. In some embodiments, an execution trace of the assembly code may be obtained by executing the workload, which may capture the data flow and dependency, memory access patterns, code branch selections, and other dynamic information of the assembly code. Based on the execution trace and the static assembly code graphs, a plurality of code graph snapshots may be generated to encode both the static code structures and the dynamic information of the assembly code at different time points during the execution. FIG. 4B describes detailed embodiments on generating the code graph snapshots.

Figure 4C:
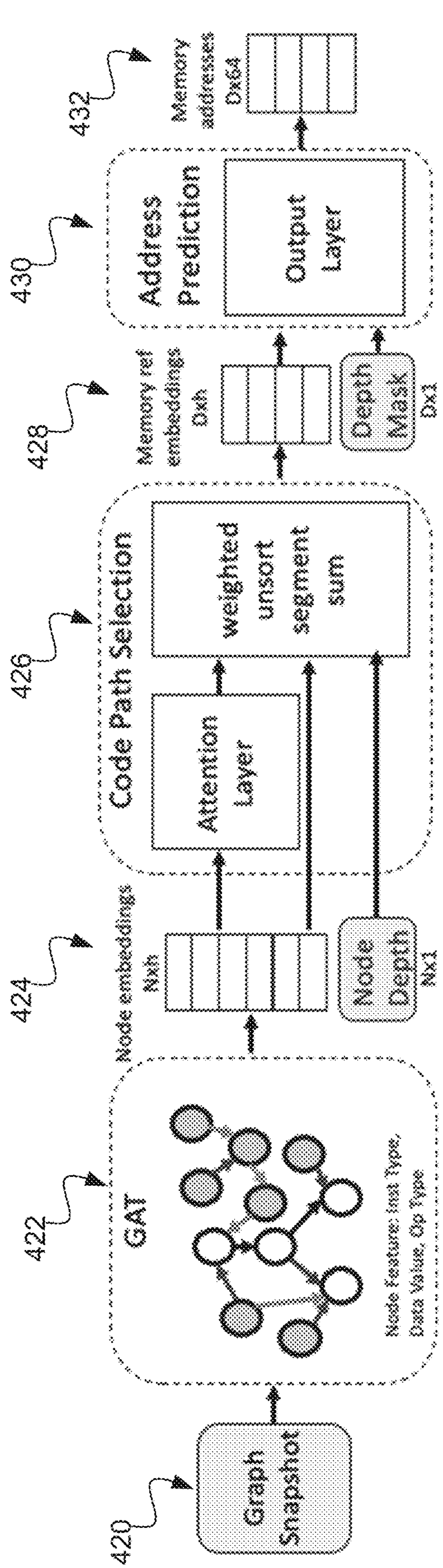
FIG. 4C illustrates an exemplary method of training the GNN for NPS in accordance with some embodiments.

After obtaining the code graph snapshots, the execution embedding generation engine 212 may feed these snapshots into a trained GNN 214 to learn code behaviors and generate execution embeddings for the execution intervals, denoted as NPS embeddings in FIG. 2A. The GNN 214 is trained to execute code, such as selecting code paths, computing values, and deriving memory access addresses, in order to capture execution information of the code. The capability of learning code behavior by the GNN 214 may be embodied by predicting consecutive memory addresses, which is challenging because it involves resolving branches, calculating values, and computing addresses altogether. FIG. 4C describes detailed embodiments on training the GNN 214.

The NPS embeddings are then fed into the sampler 216 for sampling. Since the embeddings generated by the trained GNN 214 includes both static and dynamic information of each execution interval, the sampler 216 may perform clustering algorithms on the embeddings to group the similar embeddings. The embeddings clustered in the same group may indicate that the corresponding execution intervals exhibit similar execution patterns. The sampler 216 may then pick one (or more depending on the requirement) embedding from each group, and identify the corresponding execution interval as a sampled representative interval. The execution intervals sampled by the sampler 216 may be sent back to the entity 210 for execution. For instance, the code sections in the program that correspond to the sampled execution intervals may be executed by the entity 210 to represent the execution of the entire program.

Figure 2B:
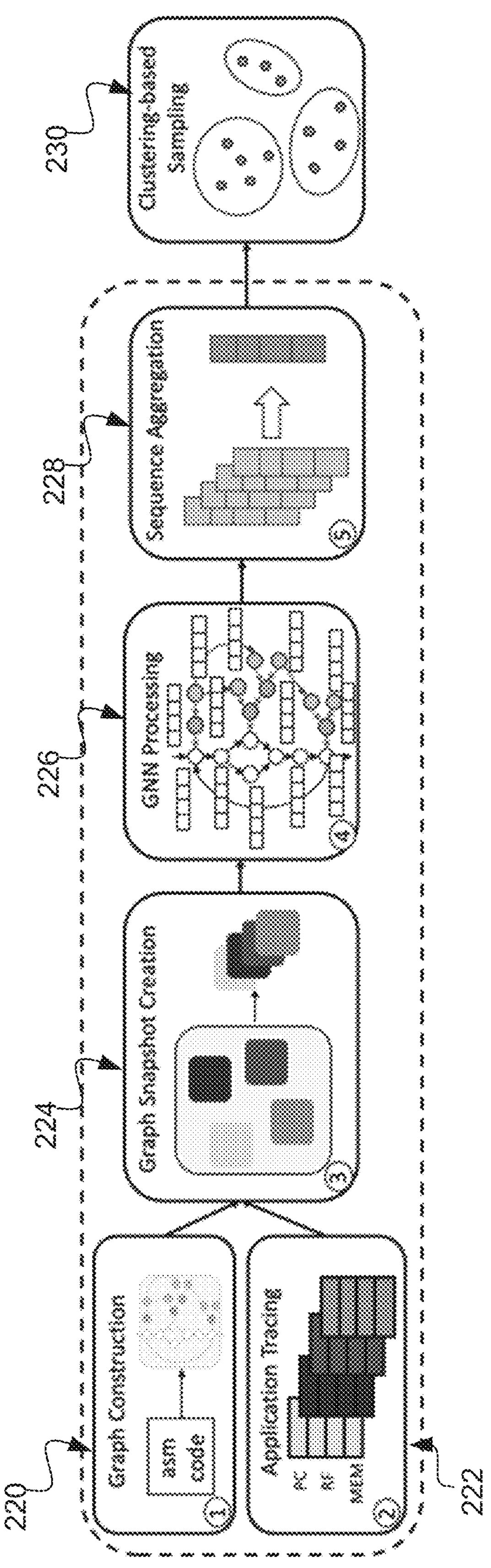
FIG. 2B illustrates an exemplary block diagram of NPS in accordance with some embodiments.

FIG. 2B illustrates an exemplary block diagram of NPS in accordance with some embodiments. As shown, the pipeline of NPS may include a plurality of functional modules, such as a graph construction module 220, an application tracing module 222, a graph snapshot creation module 224, a GNN processing module 226, a sequence aggregation module 228, and a clustering-based sampling module 230. Depending on the implementation, the pipeline may include more, fewer, or alternative modules.

In some embodiments, the graph construction module 220 may include a graph model to generate assembly code graphs based on corresponding assembly code of a program (e.g., a benchmark program written in a high-level programming language). For instance, the assembly code may be compiled from the program using a compiler. The assembly code may then be divided into a plurality of execution intervals. For each execution interval, a corresponding assembly code graph may be generated based on the control flow branches, variable value computations, memory addressing functions in the execution interval. In other words, this assembly code graph may capture the static information embedded in the execution interval, such as function sequences, the computations to be performed, the operators to be used, the memory functions to be triggered, etc.

In some embodiments, the application tracing module 222 may be collected by executing the actual program. The execution trace may capture dynamic information of the program during the runtime, such as the states of program counters (PC), register files (RF), memory addresses (MEM). These dynamic information are not available by examining the assembly code. For instance, certain variable values and corresponding memory referencing may not be available until the program is actually executed.

In some embodiments, the assembly code graphs (containing the static program information) and the execution trace (containing the dynamic program information) may be aggregated into the graph snapshot creation module 224 to generate a plurality of graph snapshots. For instance, multiple graph snapshots may be generated for one assembly code graph (corresponding to an execution interval) based on the corresponding portion in the execution trace of the program. Each graph snapshot may represent the execution status of the code interval at a given time point. In some embodiments, each graph snapshot includes at least a portion of the static assembly code graph (e.g., a graph snapshot is a subgraph of the assembly code graph) that is fused with the corresponding dynamic information learned from the execution trace of the program. In other words, each graph snapshot captures both the static information from the assembly code graph and the dynamic information for the execution trace. The dynamic information may be represented by adding one or more intermediate nodes and edges into the assembly graph, abandoning one or more branches (those branches that were not triggered) from the assembly graph, and determining one or more values (e.g., variable values, or memory addresses to be accessed) in the assembly graph.

The graph snapshot creation module 224 may generate a plurality of graph snapshots for each execution interval. These graph snapshots may then be fed into the GNN processing module 226 for vectorization. The GNN processing module 226 uses a trained GNN to predict addresses of memory references. Accuracy prediction implies that code behaviors has been learned and the key information to perform the code execution has been captured by the GNN. Here, GNN is a natural selection because the previous program abstraction is graphs (e.g., graph snapshots).

In some embodiments, the GNN processing module 226 trains a GNN that leverages node feature information (e.g., text attributes) to efficiently generate node embeddings for previously unseen data. The GNN may include several layers, each of which updates the node's embedding by transforming embeddings of neighboring nodes from the previous layer. GNNs are important tools for deep learning in learning code/program behavior. Existing work focuses on static code behavior. For example, Programing language researchers apply GNN to type inference, bug fixing, and code comparison. Abstract syntax trees are used as the key graph model for these tasks. Compiler researchers explore operator scheduling and fusion to improve system efficiency. Others optimize the vectorization factor with Reinforcement Learning to generate a high-performance vectorized code.

Here, the GNN processing module 226 is configured to learn both the static code behavior and the dynamic code behavior from the graph snapshots. Dynamic code behavior may be include branch and memory predictions that are based on real-time variable values. Branch prediction reflects control flow, which requires reasoning over program structures. Memory prediction reflects both data and control flow, which requires predicting future memory accesses based on the current execution states of the code/program.

In some embodiments, the output of the GNN processing module 226 may include vector embeddings for the graph snapshots. The embeddings are generated from one or more embedding layers in the GNN. The embedding layers may be jointly trained with one or more intermediate modules using training data. These intermediate modules may be part of the training process, but only the embedding layer(s) may be eventually deployed in the GNN processing module 226. In some embodiments, the GNN trained in the GNN processing module 226 may add layers for code path selection and memory address calculation. FIG. 4C described a detailed embodiment on training the training of GNN in the GNN processing module 226.

After obtaining the vectorized embeddings of the graph snapshots, the sequence aggregation module 228 may aggregate the embeddings to generate vectorized representations for different execution intervals. Note that each execution interval may correspond to multiple graph snapshots (e.g., each graph snapshot corresponding to a time point of execution during the execution interval) and each graph snapshot has a vectorized embedding generated from the GNN. Therefore, the task of the sequence aggregation module 228 is to aggregate the vectorized embeddings for the graph snapshots that correspond to the same execution interval into an aggregated embedding. This aggregated embedding is then used to represent the static information (e.g., code structural information) and dynamic information (e.g., execution information and predictions) of the execution interval.

In some embodiments, after obtaining each execution interval's aggregated embedding, the clustering-based sampling module 230 may be configured to perform clustering algorithms to group these embeddings into groups. Algorithms such as K-means may be used. The clustering algorithm maps the embeddings into the same space, and clusters the embeddings with short distances (e.g., shorter than a threshold) into the same group. The execution intervals whose corresponding embeddings are clustered in the same group may be deemed as similar execution intervals. Subsequently, one or more representative execution intervals from different cluster groups may be sampled for program sampling purposes.

Figure 3:
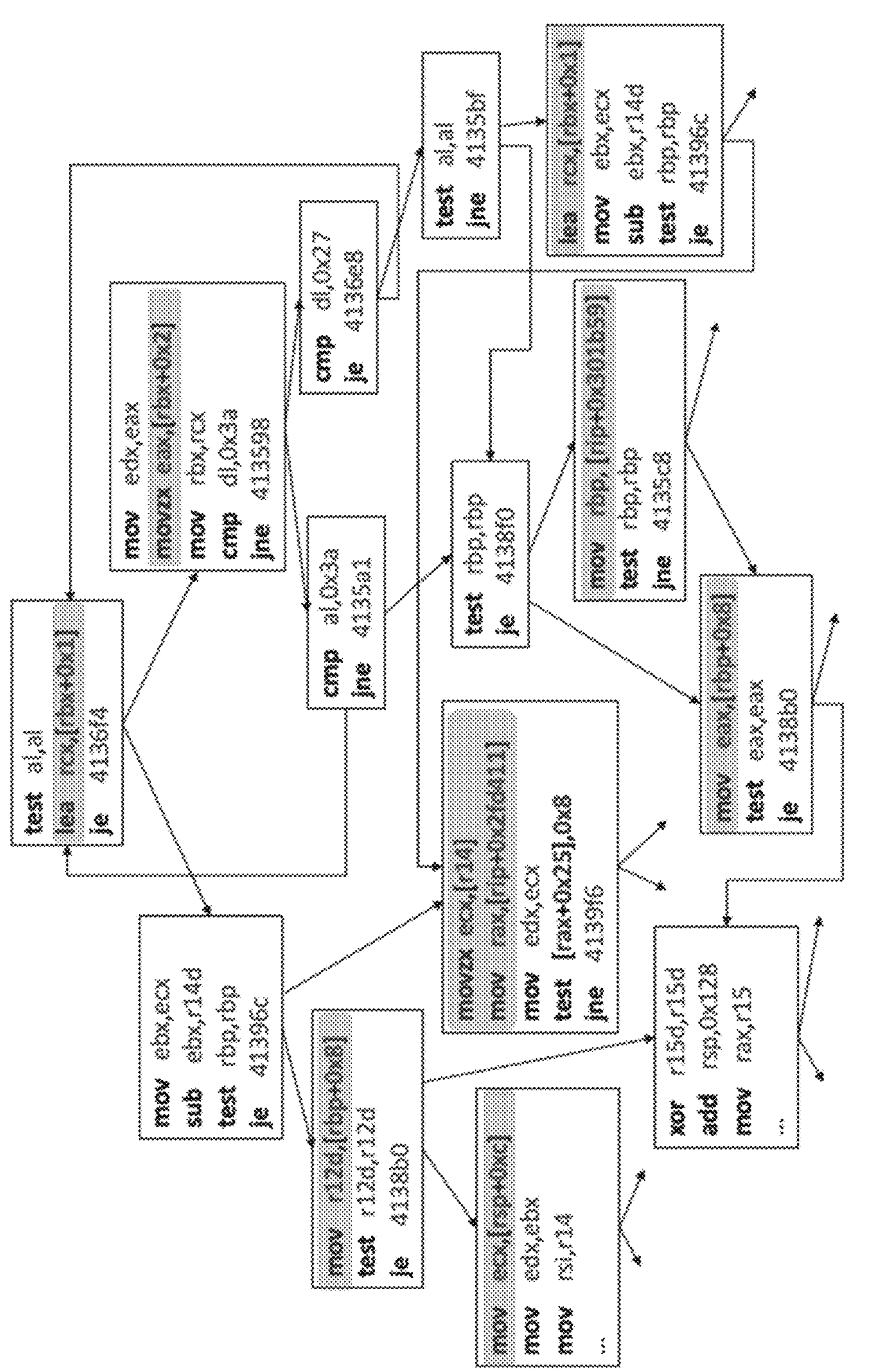
FIG. 3 illustrates an exemplary code graph for predicting memory address accesses in NPS in accordance with some embodiments.

FIG. 3 illustrates an exemplary code graph for predicting memory address accesses in NPS in accordance with some embodiments. Predicting future memory address accesses is part of learning code execution, which requires the understanding of control-flow and data-flow semantics. The code snippet illustrates in FIG. 3 shows the control flow graph, which quickly diverges after 3-5 memory references (memory access highlighted in grey). Therefore, predicting a ten 64-bit memory access address as shown in FIG. 3 is already computationally difficult due to the rapid code path divergence and complex value propagation and computation. The GNN used in NPS needs to predict all memory addresses on the path that would be executed for thousands or even tens of thousands of lines of assembly code. The training of the GNN is to learn the ability to reason fundamental mechanisms in code execution, such as resolving branches, operating instructions, computing values, and understanding data dependency. FIG. 4C describes a detailed training process of the GNN.

FIG. 4A illustrates an exemplary method of constructing assembly code graph for NPS in accordance with some embodiments. In some embodiments, the assembly code graph captures the code topology of the program's assembly code, which focuses on the static information of the program. Here, the "static information" includes not only the instructions (e.g., commands) listed in the assembly code, but also some additional functions (called pseudo functions) that are implied in the code. For instance, a memory reference function may be implied by a command that requires reading the value of a register.

In some embodiments, an assembly code graph construction module may first create and connect instruction nodes (corresponding to the instructions in the assembly code) and variable nodes (corresponding to the variables used in the assembly code), making it the graph's backbone. The edges among the instruction nodes and the variable nodes represent the control flow and data flow of the assembly code. The edges may have different types, such as source left, source right, control flow fall through, control flow branch, data compute, etc. These different types of nodes and different edges are treated differently by the GNN. Furthermore, the assembly code graph construction module may add additional nodes and edges to capture prior-known computation rules in assembly code, including instruction semantics, address calculation, and data dependency. These additional nodes may be referred to as function nodes.

In FIG. 4A, the assembly code tree on the left includes instructions (e.g., control flow including mov, sub, cmp) and variables (e.g., rax, rbx). In particular, the snippet contains three basic code blocks, one conditional branch, and instructions with data dependency. In order to execute the assembly code, some pseudo functions (not explicitly in the assembly code), such as memory referencing function (mem_ref), AND operator (&), etc., may be implied. E.g., the address calculation and memory access (e.g., [rbx+2]) function in FIG. 4A is a pseudo function. Correspondingly, instruction nodes, function nodes, and variable nodes are constructed in the graph on the right to represent the instructions, pseudo functions, and variables.

For instance, in order to encode the data dependency information into the assembly code graph, the assembly code graph construction module may need to find the writer instruction of the source registers in each instruction. For example, for instruction add rax, 1, it is necessary to find the last instruction that writes to rax. However, each source register might have multiple producers because code paths can fork and merge, consisting of cycles and nested loops. For example, former instructions may depend on later instructions in a code block in a loop. Therefore, the propagation of each producer that writes to a source register needs to be considered. In some embodiments, the algorithm works as follows. For each writer instruction that updates a register (e.g., rax), a BFS (Breadth-first Search) is performed to mark its propagation, traversing all related instruction nodes. The traversing remains active until a new instruction overwrites the same register. In addition, instruction nodes that read from that register (e.g., rax) update their bookkeeping by adding the (register id, writer instruction) pair. Finally, the graph is traversed to grow expressions and data-flow edges based on the bookkeeping. Empirical data shows that the algorithm, which is implemented in Python using a single thread, completes in minutes even for large applications such as 403.gcc (more than 200 million nodes).

FIG. 4B illustrates an exemplary method of constructing code graph snapshots for NPS in accordance with some embodiments. As explained in FIG. 2B, NPS computes code graph snapshots, which are subgraphs of the assembly code graph incorporated with dynamic information, consider surrounding codes and program states regarding the current execution context. In some embodiments, each assembly code graph corresponding to an execution interval of the program may be cross-referenced with the execution trace of the program to generate the plurality of code graph snapshots. Each code graph snapshots corresponds to the states of the program at a given time point during execution.

Prior work found that the subgraph of the current execution context in GNN has the equivalent power of capturing information about execution behavior as the full graph. This finding indicates that the runtime code behavior is largely determined by the nearby surrounding code rather than the entire program code. NPS leverages this observation and creates graph snapshots from the assembly code graph fused with program's dynamic information to encode execution behavior.

In some embodiments, the code graph snapshots may be generated by executing the algorithm illustrated in FIG. 4B. First, for a given graph node in the static graph, a memory depth is determined based on the number of memory references visited along all code paths starting from the given graph node. Breadth-first search is executed in the static graph starting from the given graph node with the constrain of the memory depth to obtain a graph instance. Then a graph snapshot may be generated by adding intermediate nodes (variable nodes and function nodes) into the graph instance.

Subsequently, the trained GNN for NPS may encode each graph snapshot into a feature vector. The feature vector effectively includes the topology information and dynamic information of a particular execution snapshot of an execution interval. The plurality of such feature vectors corresponding to the same execution interval may be aggregated to represent the topology information and dynamic information of the execution interval spanning across consecutive execution periods.

FIG. 4C illustrates an exemplary method of training the GNN for NPS in accordance with some embodiments. The GNN is a key tool of NPS for predicting addresses of memory references in a code graph snapshot from the assembly code graph. The successful prediction implies that code behavior has been learned and the key information to perform the execution has been captured by the model.

In some embodiments, the GNN for NPS may include a Graph Attention Network (GAT) 422, a type of GNN, to module code execution. For a given graph snapshot 420 (e.g., a training graph snapshot 420 during training of the GAT), the GAT assumes the contributions of neighboring nodes are different, deploying a self-attention mechanism to learn the relative weights of messages (e.g., information propagating one node to its neighboring node). The node embedding in a current layer of the GAT is computed from the incoming weighted messages and the node representation from the previous layer of the GAT. After performing all rounds of transformation for all layers, the embeddings of the nodes in the graph snapshot are generated. During the training process, the embeddings may then be used for code path selection and address prediction. During inferencing, the embeddings may be aggregated to represent the execution interval for clustering purposes.

FIG. 4C illustrates an example training process of the GAT. In order to evaluate the quality of the embeddings, the GAT may be jointly trained with a code path selection module 426 and a memory address prediction module 430. The training data may include the training graph snapshot 420 and the corresponding execution trace that includes the ground truth of the executed code paths and visited memory addresses. The ground truth may be used to compute the prediction errors of the code path selection module 426 and the memory address prediction module 430. For instance, the GAT 422 may generate node embeddings 424 for the training graph snapshot 420, and the embeddings 424 may be fed into the code path selection module 426 to predict the code path selection. In some embodiments, the node embeddings 424 and their corresponding node depth information are both fed into the code path selection module 426. The code path selection module 426 may include an attention layer and a weighted unsort segment sum layer to generate weights for code path candidates. The code path with the greatest weight may be deemed as the prediction result. The predicted code path may then be used to predict memory references, e.g., the memory addresses to be visited on the predicted code path. The predicted memory references may be generated in the form of embeddings 428. In some embodiments, the embeddings 428 of the predicted memory references and their respective depth mask may be fed into the parameterized memory address prediction module 430 to predict the memory addresses 432 to be visited on the code path. The parameters (weights) of the GAT, the code path selection module, and the memory address prediction module are trained and adjusted jointly based on the program execution trace to minimize prediction errors, e.g., the distance between the predictions (code paths and memory addresses) and the ground truth in the program execution trace.

In some embodiments, the GAT 422 may be deployed for embedding graph snapshots after the training process. The code path selection module 426 and the address prediction module 430 may be temporarily stored for the next round of training. In some embodiments, the GAT may go through additional training rounds when the target program is changed.

Figure 4D:
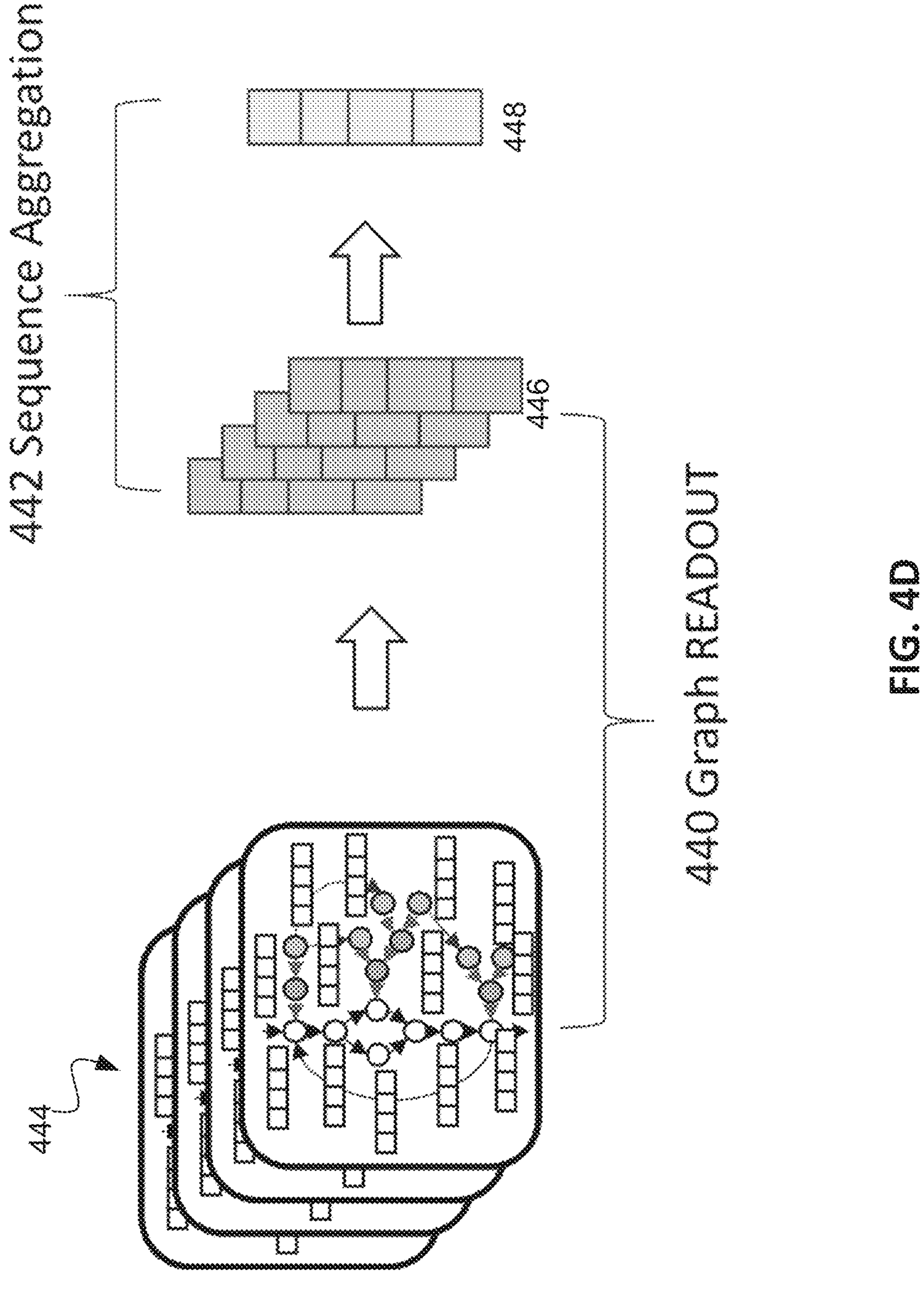
FIG. 4D illustrates an exemplary method of generating code embeddings for NPS in accordance with some embodiments.

FIG. 4D illustrates an exemplary method of generating code embeddings for NPS in accordance with some embodiments.

As described above, each program interval may correspond to an assembly code graph, and a plurality of code graph snapshots 444 may be learned based on the assembly code graph and corresponding program execution trace. In some embodiments, the trained GAT (a type of GNN) maps the graph representations of the code graph snapshots 444 into feature vectors 446 using functions like Graph READOUT function 440. The plurality of feature vectors 446 may be aggregated into one single feature vector 448 to represent the corresponding program interval. The aggregation may be referred to as a sequence aggregation process 442, which may be implemented using various methods, such as mean, sum, or concatenate.

FIG. 5 illustrates an exemplary method 500 of NPS in accordance with some embodiments. The method 500 may be implemented in an environment shown in FIG. 1A. The method 500 may be performed by a device, apparatus, or system illustrated by FIGS. 1A-5, such as the GNN-based program sampling component 112 in FIG. 1A. Depending on the implementation, the method 500 may include additional, fewer, or alternative steps performed in various orders or parallel.

Referring to the method 500 in FIG. 5, block 510 includes obtaining an assembly code of a program and an execution trace of the program.

Block 520 includes dividing the assembly code into a plurality of execution intervals, each execution interval corresponding to a portion of the assembly code. In some embodiments, the obtaining the assembly code of the program includes: compiling the program written in a high-level programming language into the assembly code of the program.

Block 530 includes constructing a plurality of code graphs respectively corresponding to the plurality of execution intervals. In some embodiments, the constructing the plurality of code graphs respectively corresponding to the plurality of execution intervals includes, for each of the plurality of execution interval: identifying instructions and variables in assembly code in the execution interval; constructing a backbone of a code graph by: creating instruction nodes and variable nodes based on the instructions and variables; connecting the instruction nodes and the variable nodes to represent a control flow and a data flow of the assembly code; adding function nodes to the backbone of the code graph to represent functions that are implied in the assembly code; and connecting the instruction nodes, variable nodes, and function nodes to form the code graph. In some embodiments, the function nodes correspond to functions including memory referencing functions.

Block 540 includes, for each of the plurality of code graphs: generating a plurality of graph snapshots based on the code graph and the execution trace of the program, wherein each of the plurality of graph snapshots includes at least a portion of the code graph fused with dynamic states of the program from the execution trace of the program; embedding, by using a Graph Neural Network (GNN), the plurality of graph snapshots into a plurality of vectors; and aggregating the plurality of vectors into an execution embedding to represent the execution interval corresponding to the code graph. In some embodiments, the generating the plurality of graph snapshots based on the code graph and the execution trace of the program includes: for a given graph node in the code graph, determining a memory depth based on a number of memory references visited along all code paths in the code graph that start from the given graph node; performing a breadth-first search in the code graph starting from the given graph node constrained by the memory depth to obtain a subgraph of the code graph; and adding intermediate nodes representing the dynamic states extracted from the execution trace to the subgraph to obtain the graph snapshot.

In some embodiments, the GNN is a graph attention network (GAT) comprising parameters jointly trained with a code path selection module and a memory address prediction module. In some embodiments, the GNN is trained by: feeding a training graph snapshot into the GAT for embedding, wherein the training graph snapshot corresponds a ground truth execution trace; obtaining, from the GAT, embeddings of function nodes in the training graph snapshot, wherein the function nodes correspond to memory reference functions in the training graph snapshot; feeding the embeddings of the function nodes into the code path selection module to predict a code path in the training graph snapshots; obtaining embeddings of memory addresses to be visited along the code path; feeding the embeddings of the memory addresses into the address prediction module to predict next memory addresses to be visited along the code path; obtaining prediction errors by comparing the predicted next memory addresses and the ground truth execution trace; and adjusting parameters of the GAT, the code path selection module, and the memory address prediction module to minimize the prediction errors. In some embodiments, the code path selection module includes an attention layer and a weighted unsort segment sum layer for generating weights for code path candidates, wherein a code path candidate with a highest weight is selected as a predicted code path. In some embodiments, after training, the GAT is deployed for embedding graph snapshots.

Block 550 includes clustering the plurality of execution embeddings representing the plurality of execution intervals into a plurality of clusters. In some embodiments, clustering the plurality of execution embeddings of the plurality of execution intervals into the plurality of clusters includes: clustering the plurality of execution embeddings using K-means.

Block 560 includes selecting representative execution intervals of the program based on the plurality of clusters for execution. In some embodiments, the selecting representative execution intervals of the program based on the plurality of clusters includes: from one or more of the plurality of clusters, selecting one execution embedding from each of the plurality of clusters; and selecting, from the program, one or more execution intervals that correspond to the one or more selected execution embeddings as the representative execution intervals.

In some embodiments, the method 500 may further include executing the representative execution intervals of the program rather than execution an entirety of the program.

FIG. 6 illustrates a block diagram of a computer system apparatus 600 for NPS in accordance with some embodiments. The components of the computer system apparatus 600 presented below are intended to be illustrative. Depending on the implementation, the computer system apparatus 600 may include additional, fewer, or alternative components.

The computer system apparatus 600 may be an example of an implementation of the method of FIG. 5 or the workflow diagram of FIG. 2B. The computer system apparatus 600 may include one or more processors and one or more non-transitory computer-readable storage media (e.g., one or more memories) coupled to the one or more processors and configured with instructions executable by the one or more processors to cause the system or device (e.g., the processor) to perform the above-described embodiments. The computer system apparatus 600 may include various units/modules corresponding to the instructions (e.g., software instructions).

In some embodiments, the computer system apparatus 600 may include a graph construction module 610, an application tracing module 620, a graph snapshot creation module 630, a GNN processing module 630, a Graph Neural Network (GNN) processing module 640, a sequence aggregation module 650, and a clustering-based sampling module 660.

In some embodiments, the graph construction module 610 and the application tracing module 620 may be configured to obtain an assembly code of a program and an execution trace of the program, respectively. The graph snapshot creation module 630 may be configured to divide the assembly code into a plurality of execution intervals, each execution interval corresponding to a portion of the assembly code, and construct a plurality of code graphs respectively corresponding to the plurality of execution intervals. The graph snapshot creation module 630 may be configured to for each of the plurality of code graphs: generate a plurality of graph snapshots based on the code graph and the execution trace of the program, where each of the plurality of graph snapshots includes at least a portion of the code graph fused with dynamic states of the program from the execution trace of the program. The GNN processing module 640 may be configured to embed, by using the trained GNN, the plurality of graph snapshots into a plurality of vectors; and aggregate the plurality of vectors into an execution embedding to represent the execution interval corresponding to the code graph. The sequence aggregation module 650 may be configured to cluster the plurality of execution embeddings representing the plurality of execution intervals into a plurality of clusters. The clustering-based sampling module 660 may be configured to select representative execution intervals of the program based on the plurality of clusters for execution.

Figure 7:
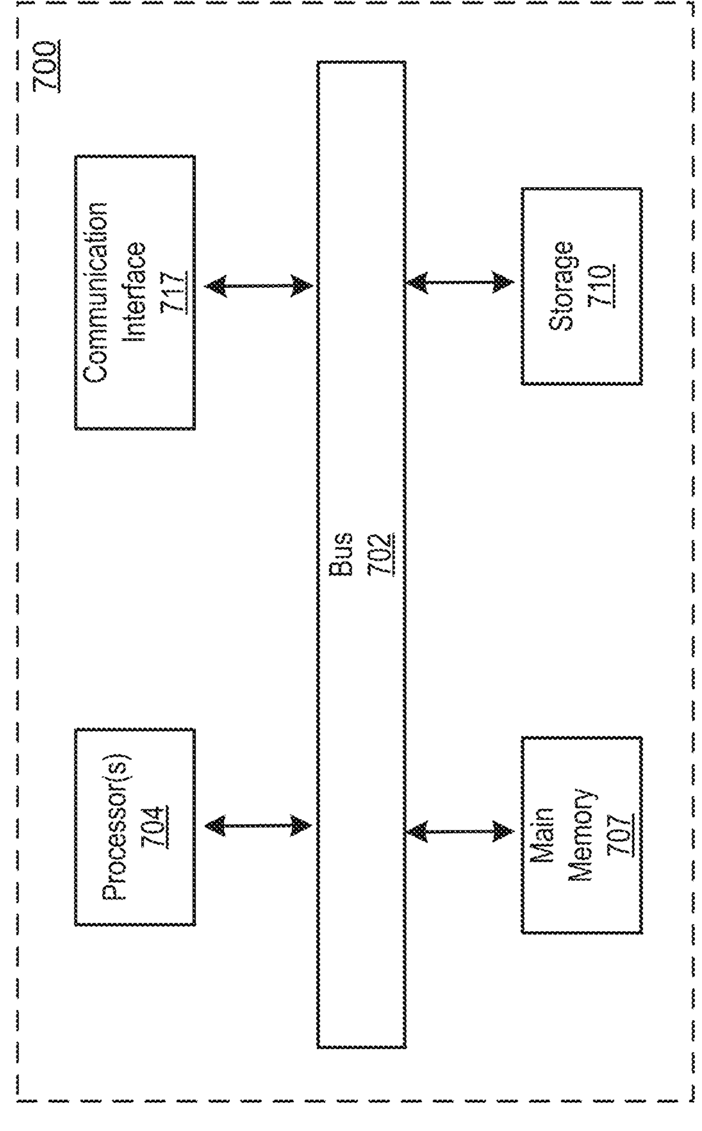
FIG. 7 illustrates an exemplary block diagram of a computer system in which any of the embodiments described herein may be implemented.

FIG. 7 illustrates an exemplary block diagram of a computer system 700 in which any of the embodiments described herein may be implemented. The computing system 700 may be used to implement one or more components of the systems and the methods shown in FIGS. 1A-6. The computing system 700 may comprise a bus 702 or other communication mechanisms for communicating information and one or more hardware processors 704 coupled with bus 702 for processing information. Hardware processor(s) 704 may be, for example, one or more general-purpose microprocessors.

The computing system 700 may also include a main memory 707, such as random-access memory (RAM), cache and/or other dynamic storage devices 710, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing system 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing system 700 may implement the techniques described herein using customized hard-wired logic, one or more ASICs or FPGAs, firmware and/or program logic which in combination with the computing device may cause or program computing system 700 to be a special-purpose machine. According to one embodiment, the techniques herein are performed by computing system 700 in response to processor(s) 704 executing one or more sequences of one or more instructions contained in main memory 707. Such instructions may be read into main memory 707 from another storage medium, such as storage device 710. Execution of the sequences of instructions contained in main memory 707 may cause the processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing system 700 also includes a communication interface 717 coupled to bus 702. Communication interface 717 may provide a two-way data communication coupling to one or more network links that are connected to one or more networks. As another example, communication interface 717 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for program sampling, comprising:

obtaining an assembly code of a program and an execution trace of the program;

dividing the assembly code into a plurality of execution intervals, each execution interval corresponding to a portion of the assembly code;

constructing a plurality of code graphs respectively corresponding to the plurality of execution intervals;

for each code graph of the plurality of code graphs:

generating a plurality of graph snapshots based on the code graph and the execution trace of the program that correspond to different time points during an execution of the program, wherein generating each graph snapshot of the plurality of graph snapshots comprises fusing a subgraph of the code graph with dynamic states of the program from the execution trace of the program, and the fusing comprises adding or removing one or more nodes or edges of the code graph based on the dynamic states of the program at a given time point during the execution of the program;

embedding, by using a Graph Neural Network (GNN), the plurality of graph snapshots into a plurality of vectors; and aggregating the plurality of vectors corresponding to the plurality of graph snapshots into an execution embedding to represent the execution interval corresponding to the code graph;

clustering the plurality of execution embeddings representing the plurality of execution intervals into a plurality of clusters; and selecting representative execution intervals of the program based on the plurality of clusters for execution.

2. The computer-implemented method of claim 1, wherein the obtaining the assembly code of the program comprises:

compiling the program written in a high-level programming language into the assembly code of the program.

3. The computer-implemented method of claim 1, wherein the constructing the plurality of code graphs respectively corresponding to the plurality of execution intervals comprises, for each execution interval of the plurality of execution intervals:

identifying instructions and variables in assembly code in the execution interval;

constructing a backbone of a code graph by:

creating instruction nodes and variable nodes based on the instructions and variables;

connecting the instruction nodes and the variable nodes to represent a control flow and a data flow of the assembly code;

adding function nodes to the backbone of the code graph to represent functions that are implied in the assembly code; and connecting the instruction nodes, variable nodes, and function nodes to form the code graph.

4. The computer-implemented method of claim 3, wherein the function nodes correspond to functions including memory reference functions.

5. The computer-implemented method of claim 1, wherein the generating the plurality of graph snapshots based on the code graph and the execution trace of the program comprises:

for a given graph node in the code graph, determining a memory depth based on a number of memory references visited along all code paths in the code graph that start from the given graph node;

performing a breadth-first search in the code graph starting from the given graph node constrained by the memory depth to obtain a subgraph of the code graph; and adding intermediate nodes representing the dynamic states extracted from the execution trace to the subgraph to obtain the graph snapshot.

6. The computer-implemented method of claim 1, wherein the GNN is a graph attention network (GAT) comprising parameters jointly trained with a code path selection module and a memory address prediction module.

7. The computer-implemented method of claim 6, wherein the GAT is trained by:

feeding a training graph snapshot into the GAT for embedding, wherein the training graph snapshot corresponds to a ground truth execution trace;

obtaining, from the GAT, embeddings of function nodes in the training graph snapshot, wherein the function nodes correspond to memory reference functions in the training graph snapshot;

feeding the embeddings of the function nodes into the code path selection module to predict a code path in the training graph snapshots;

obtaining embeddings of memory addresses to be visited along the code path;

feeding the embeddings of the memory addresses into the memory address prediction module to predict next memory addresses to be visited along the code path;

obtaining prediction errors by comparing the predicted next memory addresses and the ground truth execution trace; and adjusting parameters of the GAT, the code path selection module, and the memory address prediction module to minimize the prediction errors.

8. The computer-implemented method of claim 6, wherein the code path selection module comprises an attention layer and a weighted unsort segment sum layer for generating weights for code path candidates, wherein a code path candidate with a highest weight is selected as a predicted code path.

9. The computer-implemented method of claim 6, wherein after training, the GAT is deployed for embedding graph snapshots.

10. The computer-implemented method of claim 1, wherein clustering the plurality of execution embeddings of the plurality of execution intervals into the plurality of clusters comprises:

clustering the plurality of execution embeddings using K-means.

11. The computer-implemented method of claim 1, wherein the selecting representative execution intervals of the program based on the plurality of clusters comprises:

from one or more of the plurality of clusters, selecting one execution embedding from each of the plurality of clusters; and selecting, from the program, one or more execution intervals that correspond to the one or more selected execution embeddings as the representative execution intervals.

12. The computer-implemented method of claim 1, further comprising:

executing the representative execution intervals of the program rather than executing an entirety of the program.

13. A system comprising one or more processors and one or more non-transitory computer-readable memories coupled to the one or more processors, the one or more non-transitory computer-readable memories storing instructions that, when executed by the one or more processors, cause the system to perform operations comprising:

obtaining an assembly code of a program and an execution trace of the program;

dividing the assembly code into a plurality of execution intervals, each execution interval corresponding to a portion of the assembly code;

constructing a plurality of code graphs respectively corresponding to the plurality of execution intervals;

for each code graph of the plurality of code graphs:

generating a plurality of graph snapshots based on the code graph and the execution trace of the program that correspond to different time points during an execution of the program, wherein generating each graph snapshot of the plurality of graph snapshots comprises fusing a subgraph of the code graph with dynamic states of the program from the execution trace of the program, and the fusing comprises adding or removing one or more nodes or edges of the code graph based on the dynamic states of the program at a given time point during the execution of the program;

embedding, by using a Graph Neural Network (GNN), the plurality of graph snapshots into a plurality of vectors; and aggregating the plurality of vectors corresponding to the plurality of graph snapshots into an execution embedding to represent the execution interval corresponding to the code graph;

clustering the plurality of execution embeddings representing the plurality of execution intervals into a plurality of clusters; and selecting representative execution intervals of the program based on the plurality of clusters for execution.

14. The system of claim 13, wherein the generating the plurality of graph snapshots based on the code graph and the execution trace of the program comprises:

for a given graph node in the code graph, determining a memory depth based on a number of memory references visited along all code paths in the code graph that start from the given graph node;

performing a breadth-first search in the code graph starting from the given graph node constrained by the memory depth to obtain a subgraph of the code graph; and adding intermediate nodes representing the dynamic states extracted from the execution trace to the subgraph to obtain the graph snapshot.

15. The system of claim 13, wherein the GNN is a graph attention network (GAT) comprising parameters jointly trained with a code path selection module and a memory address prediction module.

16. The system of claim 15, wherein the GAT is trained by:

feeding a training graph snapshot into the GAT for embedding, wherein the training graph snapshot corresponds to a ground truth execution trace;

obtaining, from the GAT, embeddings of function nodes in the training graph snapshot, wherein the function nodes correspond to memory reference functions in the training graph snapshot;

feeding the embeddings of the function nodes into the code path selection module to predict a code path in the training graph snapshots;

obtaining embeddings of memory addresses to be visited along the code path;

feeding the embeddings of the memory addresses into the memory address prediction module to predict next memory addresses to be visited along the code path;

obtaining prediction errors by comparing the predicted next memory addresses and the ground truth execution trace; and adjusting parameters of the GAT, the code path selection module, and the memory address prediction module to minimize the prediction errors.

17. The system of claim 15, wherein the code path selection module comprises an attention layer and a weighted unsort segment sum layer for generating weights for code path candidates, wherein a code path candidate with a highest weight is selected as a predicted code path.

18. The system of claim 13, wherein the selecting representative execution intervals of the program based on the plurality of clusters comprises:

from one or more of the plurality of clusters, selecting one execution embedding from each of the plurality of clusters; and selecting, from the program, one or more execution intervals that correspond to the one or more selected execution embeddings as the representative execution intervals.

19. The system of claim 13, wherein the operations further comprise:

executing the representative execution intervals of the program rather than executing an entirety of the program.

20. A non-transitory computer-readable storage medium configured with instructions executable by one or more processors to cause the one or more processors to perform operations comprising:

obtaining an assembly code of a program and an execution trace of the program;

dividing the assembly code into a plurality of execution intervals, each execution interval corresponding to a portion of the assembly code;

constructing a plurality of code graphs respectively corresponding to the plurality of execution intervals;

for each code graph of the plurality of code graphs:

generating a plurality of graph snapshots based on the code graph and the execution trace of the program that correspond to different time points during an execution of the program, wherein generating each graph snapshot of the plurality of graph snapshots comprises fusing a subgraph of the code graph with dynamic states of the program from the execution trace of the program, and the fusing comprises adding or removing one or more nodes or edges of the code graph based on the dynamic states of the program at a given time point during the execution of the program;

embedding, by using a Graph Neural Network (GNN), the plurality of graph snapshots into a plurality of vectors; and aggregating the plurality of vectors corresponding to the plurality of graph snapshots into an execution embedding to represent the execution interval corresponding to the code graph;

clustering the plurality of execution embeddings representing the plurality of execution intervals into a plurality of clusters; and selecting representative execution intervals of the program based on the plurality of clusters for execution.

* * * * *